(12) United States Patent
Park et al.

(10) Patent No.: US 8,810,389 B2
(45) Date of Patent: Aug. 19, 2014

(54) APPARATUS AND METHOD FOR PATH FINDING IN MULTIMODES

(75) Inventors: Ji Sang Park, Daejeon (KR); Young-Jae Lim, Daejeon (KR); Seung-Joon Kwon, Seoul (KW); Won-Geun Choi, Seoul (KR); Sung-Woong Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 91 days.

(21) Appl. No.: 13/562,365

(22) Filed: Jul. 31, 2012

(65) Prior Publication Data
US 2013/0113623 A1    May 9, 2013

(30) Foreign Application Priority Data

Nov. 4, 2011   (KR) .......................... 10-2011-0114679

(51) Int. Cl.
*G08B 1/08*    (2006.01)
(52) U.S. Cl.
USPC ...................................... 340/539.11; 340/541
(58) Field of Classification Search
USPC ............... 340/539.13, 539.11, 541, 506, 521; 701/206, 200

IPC ............... G06Q 30/02; G06F 1/00; H04W 4/00
See application file for complete search history.

(56) References Cited

U.S. PATENT DOCUMENTS

2011/0046878 A1*   2/2011   Sung et al. .................... 701/206

FOREIGN PATENT DOCUMENTS

| KR | 10-2005-0078013 A | 8/2005 |
| KR | 10-2007-0025225 A | 3/2007 |
| KR | 10-2009-0074888 A | 7/2009 |

* cited by examiner

*Primary Examiner* — Shirley Lu
(74) *Attorney, Agent, or Firm* — Rabin & Berdo, P.C.

(57) ABSTRACT

Disclosed are an apparatus and a method for path finding in multimodes. The apparatus for path finding in multimodes includes: a location-tracking unit that tracks current locations of a plurality of terminals to generate a plurality of pieces of location information; a path-finding unit that receives a path-finding request for specific destinations common to the plurality of terminals from the plurality of terminals to find paths to the specific destinations from the location of each terminal at the time of the path-finding request and generate the plurality of pieces of path information; and a sharing server that transmits the plurality of pieces of path information and the location information of the plurality of terminals on the found paths to the plurality of terminals.

9 Claims, 2 Drawing Sheets

APPARATUS AND METHOD FOR PATH FINDING IN MULTIMODES

CROSS-REFERENCE TO RELATED APPLICATION

This application claims priority to Korean Patent Application No. 10-2011-0114679, filed on Nov. 4, 2011, which is incorporated herein by reference in its entirety.

BACKGROUND OF THE INVENTION

1. Field of the Invention

Exemplary embodiments of the present invention relate to an apparatus and a method for path finding in multimodes, and more particularly, to an apparatus and a method for path finding in multimodes that is capable of sharing information between users with a plurality of terminals and performing decision-making in real time based upon shared information, by allowing the plurality of terminals to share a plurality of pieces of location information generated by tracking current locations of the plurality of terminals and a plurality of pieces of path information generated by finding paths from the current location of each terminal to a common destination.

2. Description of Related Art

Regarding existing path finding apparatus, users can share moving routes using navigators or wireless mobile communication devices, and a route which is determined by a user is typically shared among several users. However, the shared routes that are determined by the existing path finding apparatus in state of the art can be less important, when more than two users want to meet each other at a common destination from their respective locations.

SUMMARY OF THE INVENTION

An embodiment of the present invention is directed to an apparatus and a method for path finding in multimodes that is capable of sharing information between users of a plurality of terminals and performing decision-making in real time based upon the sharing of the information, by allowing the plurality of terminals to share a plurality of pieces of location information generated by tracking current locations of the plurality of terminals and a plurality of pieces of path information generated by finding paths from the current location of each terminal to common specific destinations of the plurality of terminals.

In accordance with an embodiment of the present invention, an apparatus for path finding in multimodes includes: a location-tracking unit that tracks current locations of a plurality of terminals to generate a plurality of pieces of location information; a path-finding unit that receives a path-finding request for specific destinations common to the plurality of terminals from the plurality of terminals to find paths to the specific destinations from a location of each terminal at the time of the path-finding request and generate the plurality of pieces of path information; and a sharing server that transmits the plurality of pieces of path information and location information of the plurality of terminals on the found paths to the plurality of terminals.

The path-finding unit may use real-time location and schedule information about public transportation, and real-time traffic status information for a specific area to generate the plurality of pieces of path information.

The apparatus for path finding in multimodes may further include: a public transportation data server that provides the real-time location and the schedule information about public transportation; and a real-time traffic status data server that provides the real-time traffic information for the specific area.

The apparatus for path finding in multimodes may further include: a common server that transmits a sharing request of a first terminal among the plurality of terminals to a plurality of terminals other than the first terminal, receives at least one sharing request approval from the plurality of terminals other than the first terminal, and transmits a dedicated communication channel-establishing request for establishing a dedicated communication channel among the information-sharing terminals, including the plurality of terminals transmitting the sharing request approval to the sharing server.

The sharing server may establish the dedicated communication channel when receiving the dedicated communication channel-establishing request from the common server and transmit the path information and the location information of the information-sharing terminals to the information-sharing terminals through the dedicated communication channel.

The sharing server may transmit messages received from at least one of the information-sharing terminals to the information-sharing terminals through the dedicated communication channel.

In accordance with another embodiment of the present invention, a method for path finding in multimodes includes: tracking, by a location-tracking unit, the current location of a plurality of terminals to generate a plurality of pieces of location information; receiving, by a path-finding unit, a path-finding request for specific destinations common to the plurality of terminals from the plurality of terminals; finding, by the path-finding part, paths to the specific destinations from the location of each terminal at the time of the path-finding request to generate the plurality of pieces of path information; and transmitting, by a sharing server, the plurality of pieces of path information and the location information of the plurality of terminals on the found paths to the plurality of terminals.

At the generating of the plurality of pieces of path information, the path-finding unit may use real-time location and schedule information about public transportation, and real-time traffic status information for a specific area to generate the plurality of pieces of path information.

The method for path finding in multimodes may further include: transmitting, by a common server, a sharing request of a first terminal among the plurality of terminals to a plurality of terminals other than the first terminal; receiving, by the common server, at least one sharing request approval from the plurality of terminals other than the first terminal, and transmitting, by the common server, a dedicated communication channel-establishing request for establishing a dedicated communication channel among the information-sharing terminals including the plurality of terminals transmitting the sharing request approval to the sharing server.

The transmitting of the plurality of pieces of path information and the location information of the plurality of terminals on the found paths to the plurality of terminals may include: establishing the dedicated communication channel when the sharing server receives the dedicated communication channel-establishing request from the common server; and transmitting, using the sharing server, the path information and the location information of the information-sharing terminals to the information-sharing terminals through the dedicated communication channel.

The method for path finding in multimodes may further include: transmitting, using the sharing server, the messages received from at least one of the information-sharing terminals to the information-sharing terminals through the dedicated communication channel.

DESCRIPTION OF SPECIFIC EMBODIMENTS

Figure 1:
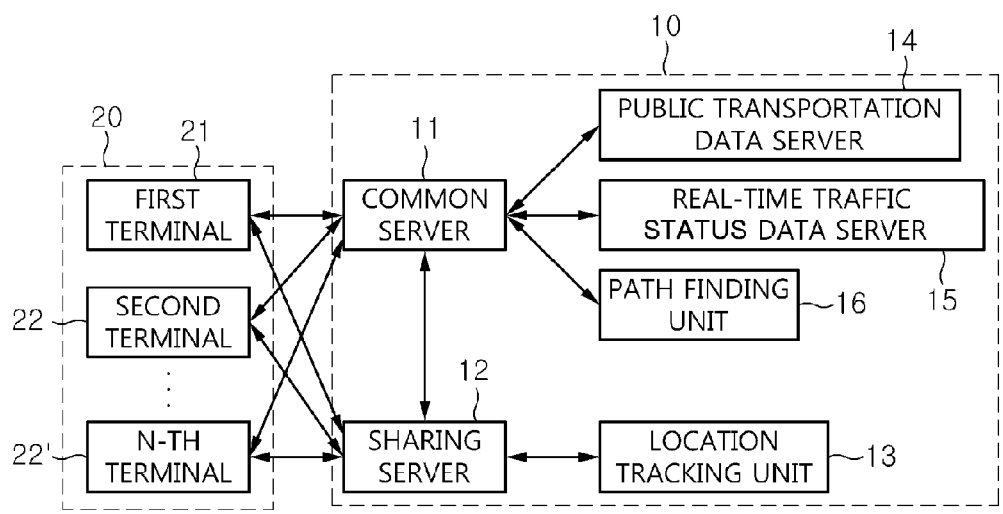
FIG. 1 is a diagram schematically illustrating an apparatus for path finding in multimodes in accordance with an embodiment of the present invention.

Exemplary embodiments of the present invention will be described below in more detail with the reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram schematically illustrating an apparatus for path finding in multimodes in accordance with an embodiment of the present invention.

Referring to FIG. 1, an apparatus 10 for path finding in multimodes in accordance with an embodiment of the present invention may be operated by being connected to a plurality of terminals 20 on a network. The plurality of terminals 20 can be configured such that their location can be tracked, for example using a global positioning system (GPS). The plurality of terminals 20 may include mobile phones, tablets, personal digital assistants (PDAs), navigation devices, or the like.

Further, the apparatus 10 for path finding in multimodes in accordance with the embodiment of the present invention may be configured to include a common server 11, a sharing server 12, a location-tracking unit 13, a public traffic data server 14, a real-time traffic status data server 15, and a path-finding unit 16. The configuration of the apparatus 10 for path finding in multimodes illustrated in FIG. 1 is based upon the embodiment of the present invention, and not all of the blocks shown in FIG. 1 are essential constituents, and therefore, some blocks may be added, changed, or deleted in other embodiments of the present invention.

The common server 11 accesses multiple users through the plurality of terminals 20 so as to mediate communication therebetween, and is connected to a data server and/or a service server. The sharing server 12 shares messages, location information, path information, or the like, among the terminals that are connected with one another. The location tracking unit 13 tracks the current location of the plurality of terminals 20 to generate a plurality of pieces of location information. The public transportation data server 14 provides a real-time location and schedule information about public transportation, such as bus, subway, or the like. The real-time traffic status data server 15 provides the real-time traffic status information for the specific area. In this case, the specific area means an area including the place in which the plurality of terminals 20 are located, and may be set in advance using the real-time traffic status data server 15 or the users of the plurality of terminals 20. The path-finding unit 16 receives a path-finding request for specific destinations common to the plurality of terminals 20 from the plurality of terminals 20, and finds the paths to the specific destinations from the location of each terminal at the time of the path-finding request to generate the plurality of pieces of path information. In FIG. 1, the path-finding unit 16 is depicted as being configured separately from the common server 11, but the path-finding unit 16 may be a type that is included in the common server 11.

The overall operation of the apparatus 10 for path finding in multimodes in accordance with the embodiment of the present invention will be described below. First, one host having a first terminal 21 starts dispatching a request to share the location information and the path information with at least one guest having a plurality of terminals 22 and 22' other than the first terminal 21. When the sharing request is transmitted to a plurality of guests receiving the sharing request through the common server 11 and the sharing request is approved, a dedicated communication channel is established among the host and the guests through the sharing server 12 linked with the common server 11, such that the basis of information sharing between the host and the guests is established.

The process of establishing the dedicated communication channel is as follows. First, the common server 11 transmits a dedicated communication channel-establishing request for establishing the dedicated communication channel among information-sharing terminals 21, 22, and 22', including the first terminal 21 and the plurality of terminals 22 and 22' transmitting the sharing request approval to the sharing server 12, and establishes the dedicated communication channel when the sharing server 12 receives the dedicated communication channel-establishing request from the common server 11.

When the dedicated communication channel is established, the common server 11 finds the optimal moving paths to the common specific destination at which the host and the guests want to meet each other based upon the location information provided by the host and the guests. In this case, the public transportation data server 14, the real-time traffic status data server 15, and the path-finding unit 16 may be used. A public traffic data server 14 provides the real-time location and the schedule information about public transportation, the real-time traffic status data server 15 provides the current traffic status information of each area in real time, and the path-finding unit 16 finds and provides the optimal moving path to the final destination from the current location of the users. In this case, the data provided from the public traffic data server 14 and the real-time traffic status data server 15, that is, the real-time location and the schedule information about public transportation, and the real-time traffic status information of the specific area, may be used. The sharing server 12 may transmit the path information and the location information of the information-sharing terminals 21, 22, and 22' to the information-sharing terminals 21, 22, and 22' through the dedicated communication channel and transmit the messages received from at least one of the information-sharing terminals 21, 22, and 22' to the information-sharing terminals 21, 22, and 22' through the dedicated communication channel.

Figure 2:
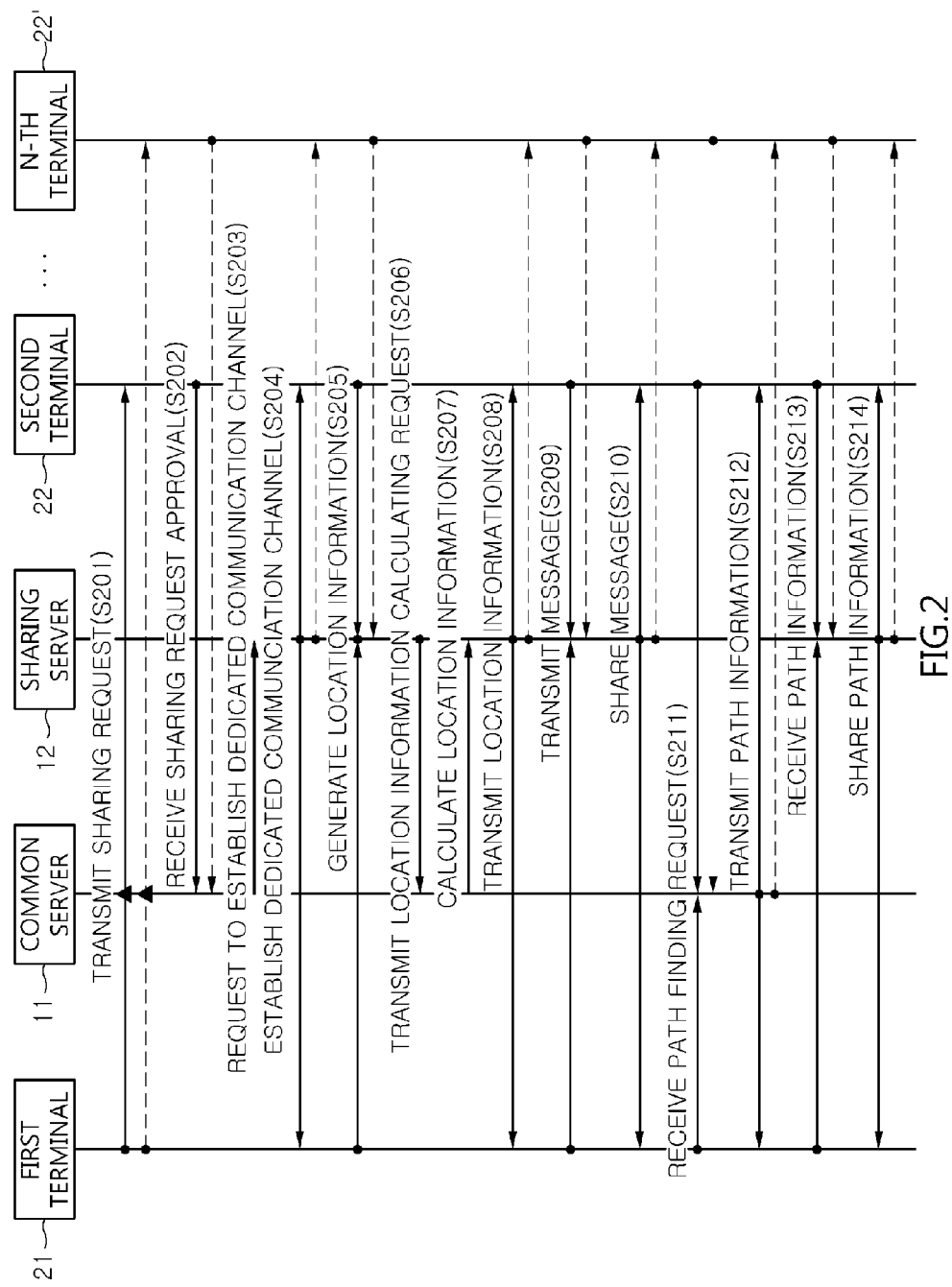
FIG. 2 is a flow chart for describing a method for path finding in multimodes in accordance with another embodiment of the present invention.

FIG. 2 is a diagram for describing a method for path finding in multimodes in accordance with an embodiment of the present invention.

In FIG. 2, a process shown by a solid line represents a process performed by the second terminal 22 and a process shown by a dotted line represents a process performed by the n-th terminal 22'. Here, the processes are substantially the same, and may be simultaneously performed. In FIG. 1, the path-finding unit 16 is depicted as being separate from the common server 11, but in the embodiment of FIG. 2, the path-finding unit 16 of FIG. 1 is included in the common server 11.

Referring to FIG. 2, the method for path finding in multimodes in accordance with the embodiment of the present invention starts transmitting a sharing request message from the host having the first terminal 21 to the guests having the plurality of different terminals 22 and 22'. That is, the common server 11 transmits the sharing request of the first terminal 21, among the plurality of terminals, to the plurality of terminals 22 and 22', other than the first terminal (S201). Further, the common server 11 receives at least one sharing request approval from the plurality of terminals 22 and 22' other than the first terminal (S202). The plurality of terminals other than the first terminal may include the second terminal and an n-th terminal 22'. Next, the common server 11 transmits the dedicated communication channel-establishing request for establishing the dedicated communication channel among the information-sharing terminals 21, 22, and 22' including the first terminal 21 and the plurality of terminals 22 and 22' transmitting the sharing request approval to the sharing server 12 (S203). The information-sharing terminals 21, 22, and 22' means the terminals wanting to share the location information and the path information, in contrast with terminals that do not transmit the sharing request or the sharing request approval with the plurality of terminals.

The sharing server 12 receiving the dedicated communication channel-establishing request establishes the dedicated communication channel (S204). Next, the sharing server 12 takes charge of the information sharing and the message transmission between the information-sharing terminals 21, 22, and 22', confirms whether the information-sharing terminals 21, 22, and 22' are connected to the dedicated communication channel and performs management, such as deleting the dedicated communication channel, or the like, according to whether the dedicated communication channel is used.

Next, the location-tracking unit connected to the sharing server 12 tracks the current location of the information-sharing terminals 21, 22, and 22' to generate the plurality of pieces of location information (S205). That is, the location information generated by tracking the current location of the information-sharing terminals 21, 22, and 22' is acquired from location-tracking apparatuses embedded in each terminal and is transmitted to the sharing server 12, which is in turn shared by all the users having the information-sharing terminals 21, 22, and 22'. In this case, the current location information of the user may be determined by the location-tracking unit based upon the found path information.

The plurality of pieces of generated location information may be transmitted and shared with the information-sharing terminals 21, 22, and 22'. However, when a terminal whose location is not tracked by the location-tracking unit is present among the information-sharing terminals 21, 22, and 22', the sharing server 12 may transmit a location information calculating request for calculating the location information of the terminal whose location is not tracked to the common server 11 (S205), and the common server 11 uses the real-time location and the schedule information about public transportation, and the real-time traffic status information of the specific area when receiving the location information calculating request to calculate the location information of the terminal whose location is not tracked (S206). Similarly, the calculated location information may be transmitted and shared with the information-sharing terminals 21, 22, and 22' (S208), the location information of each user of the provided information-sharing terminals 21, 22, and 22' may be varying information regarding the real-time location moving status, and may be transmitted to each user from the sharing server 12 so that the terminals share the location information of all the users using the corresponding services.

In addition, the sharing server 12 may share messages between the information-sharing terminals 21, 22, and 22' in addition to the above-mentioned location information. That is, when messages are received from at least one of the information-sharing terminals 21, 22, and 22' (S209), the messages are transmitted to the information-sharing terminals through the dedicated communication channel (S210) and thus, may be shared by the information-sharing terminals 21, 22, and 22'. In the method for path finding in multimodes in accordance with the embodiment of the present invention, the process of sharing the messages can be performed any time that the users of the terminals want to converse with one another, from the time at which the dedicated communication channel is established until the time at which the method for path finding in multimodes ends.

The path-finding unit included in the common server 11 receives the path-finding request for the specific destinations common to the information-sharing terminals 21, 22, and 22' from the information-sharing terminals 21, 22, and 22' (S211) and generates the plurality of pieces of path information by finding the path to the specific destinations from the location of each terminal at the time of the path-finding request. In this case, the path-finding unit may use the real-time location and the schedule information about public transportation, and the real-time traffic status information of the specific area to generate the plurality of pieces of path information. The plurality of pieces of generated path information is transmitted to each information sharing terminal 21, 22, and 22' (S212). Further, the sharing server 12 again receives the path information from the information-sharing terminals 21, 22, and 22' (S213) to transmit all of the received path information to the information-sharing terminals 21, 22, and 22' (S214), such that the information-sharing terminals 21, 22, and 22' can share the path information.

The plurality of pieces of path information shared by the above-mentioned process and the location information of the terminals on the found paths is the basis of allowing the terminal users to track the location and moving status therebetween and making decisions in real time.

In accordance with the embodiments of the present invention, it is possible to provide the apparatus and the method for path finding in multimodes capable of sharing the information between users of the plurality of terminals and making decisions in real time based upon the shared information, by allowing the plurality of terminals to share a plurality of pieces of location information generated by tracking current locations of the plurality of terminals and the plurality of pieces of path information generated by finding the paths from the current location of each terminal to the common specific destinations of the plurality of terminals.

Further, the apparatus and the method for path finding in multimodes in accordance with the embodiments of the present invention can provide the optimal moving paths to the users of the plurality of terminals by generating the plurality of pieces of path information using the real-time location and the schedule information about public transportation, and the real-time traffic status information for the specific area.

While the present invention has been described with respect to specific embodiments thereof, it will be apparent to those skilled in the art that various changes and modifications may be made without departing from the spirit and scope of the invention as defined in the following claims.

What is claimed is:

1. An apparatus for path finding in multimodes, comprising:

a location-tracking unit that tracks a current location of a plurality of terminals to generate a plurality of pieces of location information;

a path-finding unit that receives a path-finding request for specific destinations common to the plurality of terminals from the plurality of terminals to find paths to the specific destinations from a location of each terminal at the time of the path-finding request and generate a plurality of pieces of path information;

a sharing server that transmits the plurality of pieces of path information and the location information of the plurality of terminals on the found paths to the plurality of terminals; and a common server that transmits a sharing request from a first terminal among the plurality of terminals to a plurality of terminals other than the first terminal, receives at least one sharing request approval from the plurality of terminals other than the first terminal, and transmits a dedicated communication channel-establishing request for establishing a dedicated communication channel among the information-sharing terminals including the plurality of terminals transmitting the sharing request approval to the sharing server.

2. The apparatus of claim 1, wherein the path-finding unit uses real-time location and schedule information about public transportation, and real-time traffic status information for a specific area to generate the plurality of pieces of path information.

3. The apparatus of claim 2, further comprising:
a public transportation data server that provides the real-time location and the schedule information about public transportation; and
a real-time traffic status data server that provides the real-time traffic information for the specific area.

4. The apparatus of claim 1, wherein the sharing server establishes the dedicated communication channel when receiving the dedicated communication channel-establishing request from the common server and transmits the path information and the location information of the information-sharing terminals to the information-sharing terminals through the dedicated communication channel.

5. The apparatus of claim 4, wherein the sharing server transmits messages received from at least one of the information-sharing terminals to the information-sharing terminals through the dedicated communication channel.

6. A method for path finding in multimodes, comprising:
tracking, by a location-tracking unit, current locations of a plurality of terminals to generate a plurality of pieces of location information;

receiving, by a path-finding unit, a path-finding request for specific destinations common to the plurality of terminals from the plurality of terminals;

finding, by the path-finding part, paths to the specific destinations from a location of each terminal at the time of the path-finding request to generate a plurality of pieces of path information;

transmitting, by a sharing server, the plurality of pieces of path information and the location information of the plurality of terminals on the found paths to the plurality of terminals;

transmitting, by a common server, a sharing request of a first terminal among the plurality of terminals to a plurality of terminals other than the first terminal;

receiving, by the common server, at least one sharing request approval from the plurality of terminals other than the first terminal, and transmitting, by the common server, a dedicated communication channel-establishing request for establishing a dedicated communication channel among the information-sharing terminals including the plurality of terminals transmitting the sharing request approval to the sharing server.

7. The method of claim 6, wherein at the generating the plurality of pieces of path information, the path-finding unit uses real-time location and schedule information about public transportation, and real-time traffic status information for a specific area to generate the plurality of pieces of path information.

8. The method of claim 6, wherein the transmitting the plurality of pieces of path information and the location information of the plurality of terminals on the found paths to the plurality of terminals includes:
establishing the dedicated communication channel when the sharing server receives the dedicated communication channel-establishing request from the common server; and
transmitting, by the sharing server, the path information and the location information of the information-sharing terminals to the information-sharing terminals through the dedicated communication channel.

9. The method of claim 8, further comprising: transmitting, using the sharing server, the messages received from at least one of the information-sharing terminals to the information-sharing terminals through the dedicated communication channel.

* * * * *